Dec. 6, 1938.     R. L. CARR     2,138,838
WINDOW ARRANGEMENT
Filed Jan. 14, 1936     4 Sheets-Sheet 1
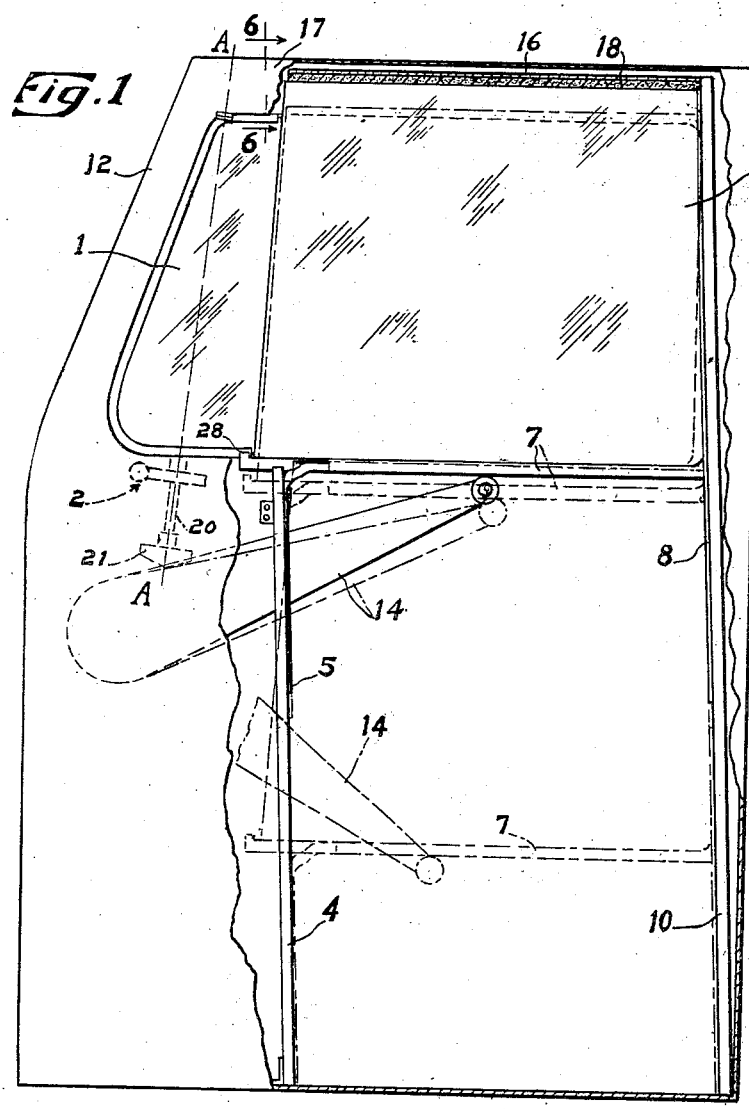
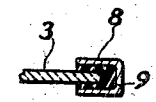
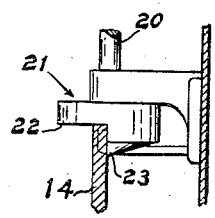
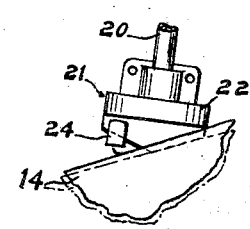
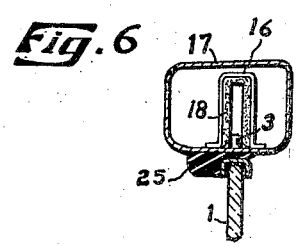
Inventor
Raymond L. Carr Dec. 6, 1938.　　　　　R. L. CARR　　　　　2,138,838
WINDOW ARRANGEMENT
Filed Jan. 14, 1936　　　4 Sheets-Sheet 2
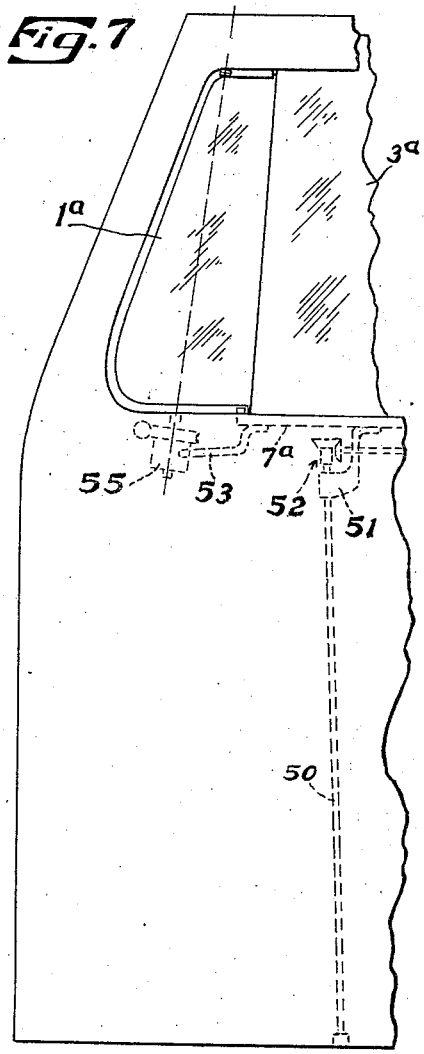
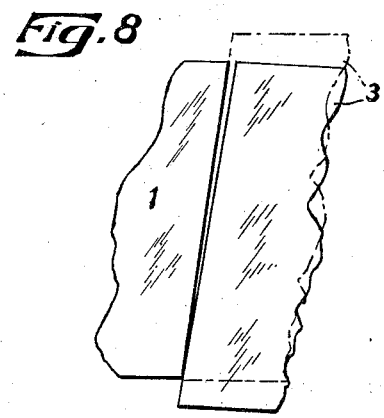
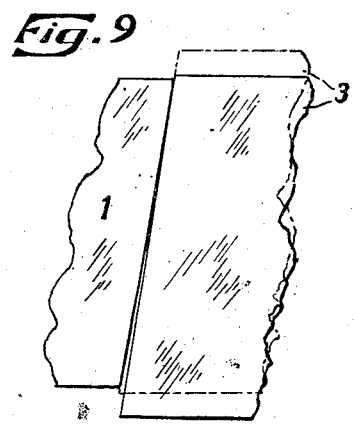
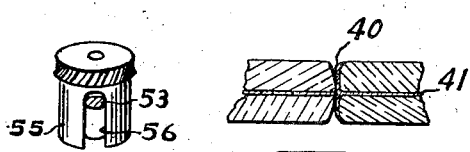
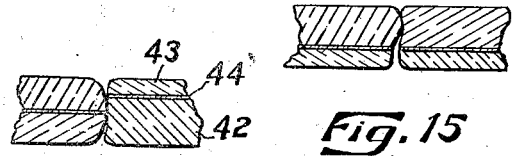
Inventor
Raymond L. Carr

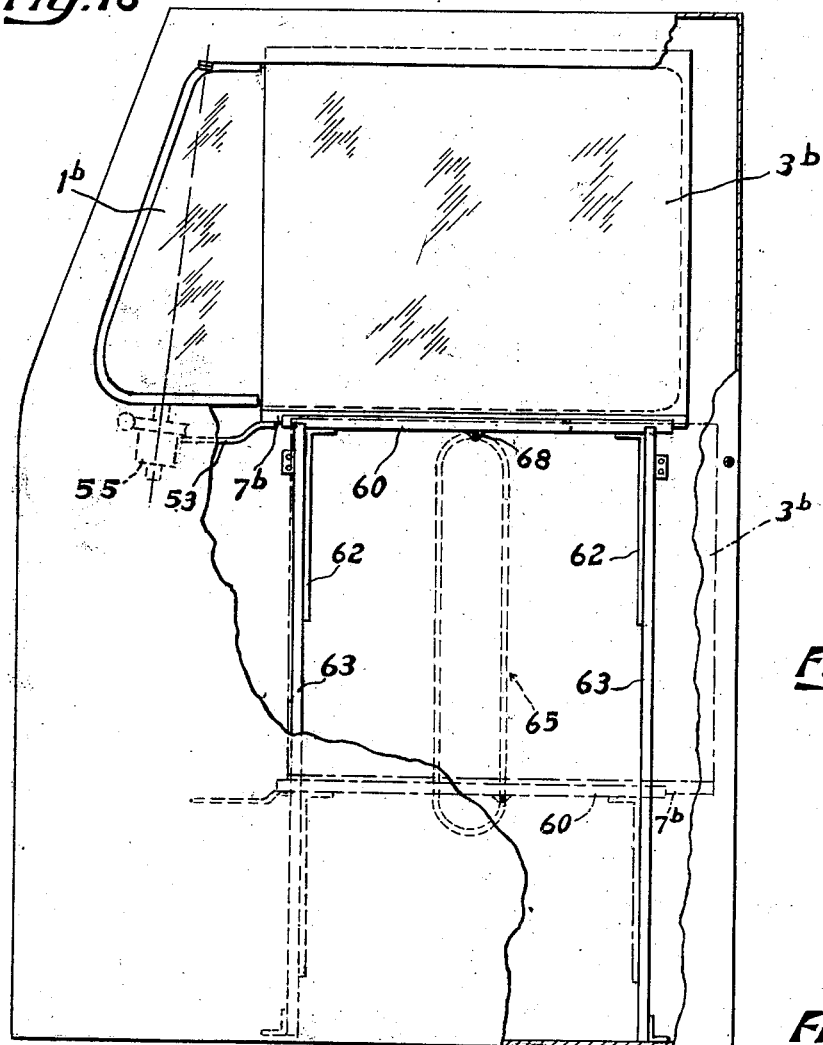
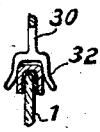
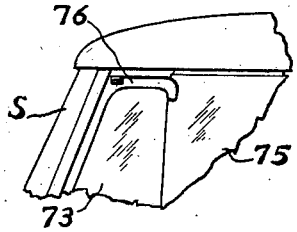
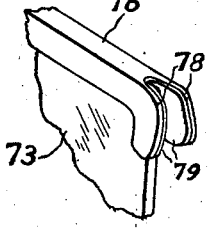
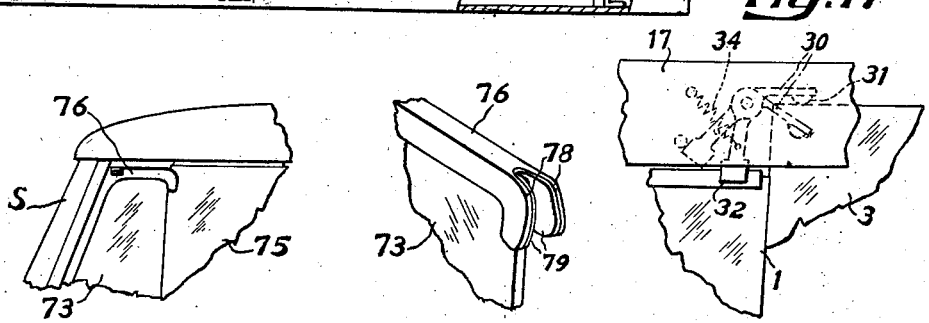

Dec. 6, 1938.   R. L. CARR   2,138,838
WINDOW ARRANGEMENT
Filed Jan. 14, 1936   4 Sheets-Sheet 4

Inventor
Raymond L. Carr

Patented Dec. 6, 1938

2,138,838

UNITED STATES PATENT OFFICE 2,138,838

WINDOW ARRANGEMENT

Raymond L. Carr, Boston, Mass.

Application January 14, 1936, Serial No. 59,113

15 Claims. (Cl. 296—44)

This invention relates to improved vehicle window arrangements, and particularly to combinations including a window swinging about a generally vertical or up-and-down axis and a second window moving in its own plane, said windows, when in closed position, forming a composite closure. My United States Patent No. 1,826,865 discloses a window construction wherein a panel has a swinging movement about a rearwardly moving vertical axis and a second panel is vertically movable in its own plane. The present invention is particularly directed to such constructions wherein the swinging window moves about a fixed up-and-down axis and preferably wherein both the windows may be mounted on a single body wall section, as, for example, on a single door.

The present invention provides substantially continuous transparent composite closures permitting weather-tight joints between the panel edges, while only subjecting the glass panels to conditions of use and stresses which they are fully adapted to meet. These constructions require only simple panel movements and simple, inexpensive operating mechanisms. This aspect of the present invention is a further development of and improvement upon subject matter disclosed in my copending application Serial No. 673,859, filed June 1, 1933. In accordance with this invention, the transparent panels preferably have juxtaposed edges which afford a substantially butt-type joint, the panels being yieldably pressed together in the direction of their own planes. Such features of the present invention are also characteristics of the subject matter of my copending application Serial No. 69,783, filed March 20, 1936.

Preferably the glass edges are arranged to afford a narrow seam-like joint which is attractive in appearance and which does not appreciably impair vision. Such a joint may be characterized by edge surfaces which have a primary direction of extent transversely of the panels rather than longitudinally thereof and which may be shaped so that a slight interfitting effect may be afforded.

Panel edges of this type may be, in effect, perfectly straight as viewed in side elevation and may be yieldably pressed into engagement by suitable means which causes the edges to be self-adjusting so that the entire length of the joint between the panels may be closed to afford a weather-tight seal. Such an arrangement is particularly advantageous not only due to its improved and unobtrusive appearance, but also because strains imposed upon the glass are substantially within the plane of the same and are primarily compressive strains, which the glass is especially adapted to withstand, while such slight lateral warping of the glass as may occasionally occur does not materially impair the effectiveness of such a joint.

A further aspect of the present invention relates to the provision of interlocking means and guiding means to prevent the movement of the panels when breakage or chipping thereof might result from such a movement and to assure the proper guiding of the panel edges into registration and their retention in that position. While such interlocking means may be employed with other constructions, it is particularly advantageous in permitting glass panels to have their transparent edges maintained in proper juxtaposition. To permit such results, means are provided to prevent the engagement of the edges until the swinging panel is in its closed position, whereupon the second panel may be brought into firm endwise engagement with the swinging panel. After this has occurred, the interlocking means prevents movement of the swinging panel until the second panel has moved away from the first panel.

Furthermore, the present invention permits especially effective guiding and retaining means to be employed to assure the proper accurate registration of the narrow glass edges. For this purpose, the upper and lower ends of the panel edges are accurately positioned laterally of the vehicle wall, and the panel which cooperates with the swinging panel, i. e., the second panel, may conveniently have a movement in its own plane with at least a component directed toward the edge of the swinging panel which it is to contact. For example, the swinging panel may be arranged with a rearwardly inclined edge and/or the second panel may be directed upwardly and forwardly to contact such edge.

The principles of the invention are not only applicable to combinations including a generally vertically movable second panel, but also to arrangements involving panels following curved paths and panels which are longitudinally movable, the latter being particularly suitable for rear quarter window constructions. Furthermore, the principles of this invention may also be employed in convertible constructions.

Another aspect of the invention is closely related to the subject matter of my copending application Serial No. 670,488, filed May 11, 1933 (United States Patent No. 2,028,143, issued January 21, 1936), providing a swinging filler strip which may fill the gap between spaced overlapped panel edges. Such a strip may ordinarily remain in a lowered substantially concealed position so that the panels may have their transparent edges exposed and may afford the effect of a substantially continuous transparent closure. Under unusually inclement weather conditions or when the vehicle is to be locked, the filler strip may be moved to its operative position, thus closing the space between the panels.

In the accompanying drawings:

Fig. 1 is a side elevation of a vehicle door having panels arranged in accordance with the principles of this invention;

Fig. 2 is a sectional detail showing the arrangement of the rear panel in its frame;

Fig. 3 is a sectional view of the front or swinging panel with a part of the second panel shown in front elevation;

Fig. 4 is a view, partly in section and partly in elevation, showing the interlocking means;

Fig. 5 is a side elevational detail of parts shown in Fig. 4;

Fig. 6 is a section indicated by line 6—6 of Fig. 1;

Fig. 7 is a broken side elevation of a portion of a door showing an optional form of interlocking means and window lifting means;

Figs. 8 and 9 are broken elevational views, somewhat diagrammatic in character, illustrating the self-adjusting principles of the panel mounting which is disclosed herein;

Fig. 10 is a view partly in section and partly in rear elevation showing the interlocking means disclosed in Fig. 7;

Figure 21:
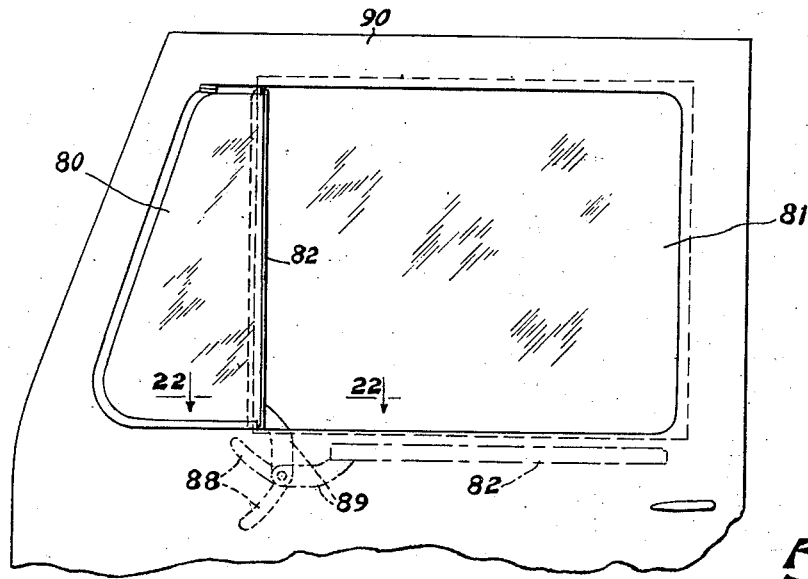
Figure 22:
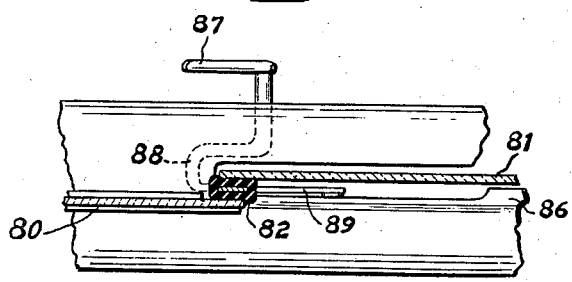
Figure 23:
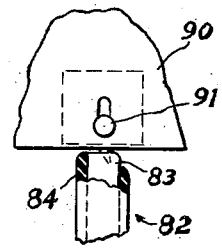
Figure 25:
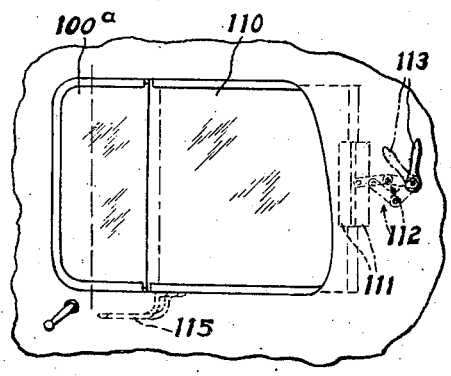
Figure 24:
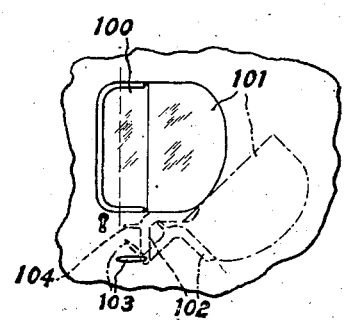

Figs. 11 to 15 inclusive are horizontal sectional details showing various forms of joints which may be employed at the contacting panel edges;

Fig. 16 is a view similar to Fig. 1, but showing optional panel lifting means and interlocking means;

Fig. 17 is an elevational detail illustrating an optional retaining means to aid in holding the panel edges in registration;

Fig. 18 is a sectional detail of a portion of the assembly shown in Fig. 17;

Fig. 19 is a broken side elevation of a part of a convertible body, having panels arranged in accordance with this invention;

Fig. 20 is an isometric detail view of the upper rear corner of the swinging panel shown in Fig. 19;

Fig. 21 is a side elevation of the upper part of a door provided with closure means including a swinging filler strip;

Fig. 22 is an enlarged section on line 22—22 of Fig. 21;

Fig. 23 is an elevational detail of the inside of the door and an adjoining portion of the filler strip of the type shown in Fig. 21, a part being broken away; and Figs. 24 and 25 are interior elevational views of portions of vehicle walls showing other optional embodiments of the invention.

In the accompanying drawings, which illustrate the principles of this invention, certain well-known and conventional means have not been illustrated in detail, such, for example, as the sealing strips which are conventionally employed about swinging panels, the details of the regulator mechanism, and the like, since such means are not necessary to an understanding of the present invention and do not form a part of the novel features thereof.

Fig. 1 illustrates a typical arrangement of window panels on one body wall section, such as a vehicle door, embodying the principles of this invention. The door may be provided with a single window opening which is not divided by a post or metal stanchion, a swinging panel 1 being arranged at the front of the window opening and being movable about a pivot axis A—A so that, for example, its front edge may swing inwardly and its rear edge may swing outwardly in the well-known manner, it being understood that in practice the panel 1 may swing outwardly to a very substantial angle, i. e., an angle of the order of 90° to the plane of the body wall. It is furthermore to be noted that the door is provided with an inclined front rail portion 12 which is adapted to be juxtaposed to the inclined standard of a windshield assembly. As shown, the axis A—A inclines upwardly and toward the rear of the door, but such an inclination is not at all necessary to the principles of the present invention. The panel 1 may be provided with suitable conventional regulator mechanism 2, such as a worm and a worm gear, the former being operated by the conventional hand crank (not shown). The swinging panel may have a frame extending along its lower, front, and upper edges, these edges of the glass being mounted in rubber or coated with cellulosic material which is disposed between the glass and the frame.

The door is also provided with a rear upwardly movable panel 3 which is constrained to move only within its own plane. Preferably, as shown, the panel 3 is provided with an upwardly and rearwardly inclined front edge and the rear edge of the panel 1 is similarly inclined. Furthermore, the rear panel is arranged to move upwardly and somewhat forwardly. Such arrangements permits the front edge of the panel 3 to have a movement with an appreciable component perpendicular to the inclined edge of the panel 1. It is of course evident that the principles of this invention might be employed when the panel 1 is provided with an inclined edge but the panel 3 moves vertically, or when the panel 1 is provided with a vertical edge and the panel 3 has an inclined path or a path with a longitudinally directed component.

Any suitable guiding means may be provided for the panel 3. As shown in Fig. 1, such guiding means may be arranged so that the panel follows a straight-line path. For this purpose a front guide channel 4 is provided and a slider 5 is connected to the horizontal channeled frame 7 of the panel 3. The slider 5 fits within the guideway 4 which is disposed laterally at one side of the panel 3 and, as shown in Fig. 1, is disposed outwardly relative to the same.

Preferably the horizontal panel frame member 7 is joined to a vertical member 8 which may also be of channel cross section, the lower horizontal edge of the glass and the rear edge of the glass being received in the members 7 and 8, respectively. As shown in Fig. 2, suitable rubber cushioning means 9 is disposed between the margin of the glass and the metal framing. Such cushioning means may be arranged so that the panel is capable of only slight transverse movement relative to the frame, but may have a substantially greater movement in its own plane relative to the metal frame members 7 and 8. The member 8 preferably extends downwardly below the horizontal frame member 7 so that it is comparatively long and has a relatively large surface slidably received in a guide channel 10. It is evident that the channels 4 and 10 are parallel to each other and define the upwardly and forwardly inclined rectilinear path of the panel 3 between the lower dot and dash line position shown in Fig. 1 and the raised position illustrated in full lines.

Any suitable lifting mechanism may be employed to cause the movement of the panel along its path and to hold it in any desired adjusted position. Such mechanism, for example, may include the conventional swinging arm 14 which may be operated by suitable gearing and may be provided with the conventional counterspring means and the conventional locking means so that the panel 3 may be supported in any position along its path.

In accordance with this invention, a relatively deep inverted channel 16 preferably is provided in the top rail 17 of the door (Fig. 6), a suitable cushioning channel 18 being disposed within the metal channel 16 and being arranged to receive the upper edge of the panel 3 in the conventional manner. Preferably the panel 3 has a greater vertical extent than ordinarily would be provided for a window opening of the size illustrated in Fig. 1 so that when the panel is fully raised, its upper edge is disposed in the upper part of the cushioning channel 18. However, the panel 3 may be moved to a closed position, shown by dot and dash lines in the upper part of Fig. 1 and by full lines in Fig. 6, wherein its upper edge is received in the lower part of the channel 16. Thus to all intents and purposes, the window 3 may be closed while still definitely below its fully raised position. In this closed position, as is evident from the dot and dash line position of Fig. 1, the inclined edge of the panel 3 is appreciably spaced from the adjoining edge of panel 1 so that the latter may be swung to any desired position without affecting the rear panel. In order, however, to permit the proper registration of the panel edges as they are brought into mutual contact, special interlocking means may be provided, such means being arranged to prevent the final movement of the panel 3 to its uppermost position until the panel 1 has been swung to its closed position, and when the panel 3 is at its uppermost position, preventing the panel 1 from moving out of its closed position.

An interlocking means of this character may comprise a part movable with the swinging panel and a second part movable with the second panel. The parts are arranged so that when the swinging panel is in open position, the first part blocks the path of the second part, thus preventing the final movement of the second panel; but when the swinging panel is moved to closed position, the first part moves out of the path of the second part so that the second panel can then move to its final position to engage the swinging panel. In this position, the second part preferably prevents the movement of the first part and consequently of the swinging panel, so that the panels can not be disengaged except by the movement of the second panel away from its final position.

One form of such interlocking means is shown in Figs. 1, 4 and 5, the shaft upon which the worm gear of the regulating mechanism 2 is mounted being extended as designated by numeral 20 and supporting a locking member 21 at its lower end. This locking member, as shown, may have a disk-like or cylindrical upper portion 22 and may have one-half of this cylindrical portion extended downwardly and terminating in a semi-conical lower portion 23. Thus a planar diametric face substantially in the plane of panel 1 is provided by the downwardly extending semi-cylindrical and semi-conical portions of the member 21. When the panel 1 moves to its closed position, the shaft 20 is effective in swinging the member 21 so that its planar surface may engage a stop 24 that is connected to the inner wall of the door, thus definitely limiting the movement of the panel 1, it of course being understood that the edges of the panel 1 engage yieldable sealing means of the conventional type, a portion of such sealing means being shown in Fig. 6 and identified by numeral 25.

The member 21 is so arranged and disposed relative to the lifter arm 14 that, when the panel 1 is in an opened or partly opened position, i. e., out of coplanar relationship to the panel 3, the upper edge of the arm 14 is engageable with the lower conical surface of the member 21, as indicated in dot and dash lines in Fig. 5. Thus the arm 14 is stopped in the position indicated by dot and dash lines in Fig. 1 and the panel 3 is disposed in the position shown in Fig. 6 with its upper edge located slightly within the channel 16. When the member 21 occupies such a position, the regulating mechanism 2 may be readily operated to swing the panel 1 to any desired angle or the panel 3 may be moved to any position including or between the two positions shown in dot and dash lines in Fig. 1. When, however, the panel 1 is swung to its closed position, the member 14 may be moved upwardly to the full line position shown in Figs. 1 and 5 and the position shown in Fig. 4, wherein its inner surface is juxtaposed to the diametric surface of the member 21. When this occurs, the upper edge of the panel 3 moves into the upper part of the cushioning channel 16 and the front edge of the panel 3 contacts the rear edge of panel 1. The member 14 is then positioned so that it prevents movement of the member 21 and of the panel 1 in one direction, the movement of these parts in the opposite direction being positively limited by the stop 24. Thus the panel 1 is definitely held in alignment with the panel 3 as long as the latter is at or near its uppermost position. As the final movement of the panel 3 occurs, the rubber cushioning means in the members 7 and 8 is slightly compressed so that the edge of the second panel is firmly, yet yieldably pressed against the edge of the swinging panel.

The arrangement which has been described is an important feature of this invention, since it permits the accurate engagement of the panel edges along their entire lengths without requiring nicety of workmanship and particular accuracy in the arrangement of the panel guiding and supporting means. While it is theoretically possible to arrange the guiding means so that the inclined front edge of panel 3 would always be positioned exactly parallel to the rear edge of panel 1, practically such a construction would involve a cost and degree of care which would be difficult to employ in commercial production.

With the arrangement which has been described, however, the front edge of panel 3 may have a slight inclination in either direction, i. e., upwardly and forwardly, or upwardly and rearwardly, relative to the edge of panel 3 when these edges initially contact; and, when the final movement of the panel 3 is accomplished and as the rubber 9 is compressed, the edges of the panels will be brought into complete engagement. Figs. 8 and 9 illustrate movements of the panel which may occur under these conditions, the relative angular positions of the panels obviously being exaggerated for ease of illustration. Thus, as shown in full lines in Fig. 8, the panel 3 may first engage the lower corner of panel 1, but continuous upward movement of the panel 3 results in a slight turning movement thereof in an anticlockwise direction relative to its frame, such a movement being automatically effected due to the forces to which it is subjected by the upwardly moving frame and by the corner of panel 1 until the entire edge of panel 1 is engaged by the edge of panel 3, as indicated by the dot and dash line positioning of the panel 3 in Fig. 8. Similarly, if the panel 3 first engages the upper rear corner of panel 1 (Fig. 9), its continued upward movement and the yieldability of its rubber mounting causes the entire edge of panel 3 to be engaged by the panel 1, the panel 3 under these conditions having a slight turning movement in its own plane in a clockwise direction relative to its supporting frame.

It is furthermore evident that the yieldable mounting of the panel permits its slight endwise movement and assures its firm engagement with the panel 1 without the necessity of providing accurately gauged stop means. Furthermore, this panel mounting affords a suitable take-up to compensate for any slight permanent distortion of the rubber which may occur, the window 3 then being movable somewhat higher to further compress the cushioning channel 16 and to permit the provision of a tight joint between the panel edges.

Proper registration of the panel edges is assured since the lower part of the front of panel 3 is accurately positioned laterally of the body by the channel 7 and slider 5, and since the upper part of that panel is accurately positioned by the channels 16 and 17, it being evident that the stop 14, member 21 and shaft 20 cooperate with the framing of panel 1 in accurately positioning the rear edge of the latter.

It will now be apparent that the panel arrangement is automatically self-adjusting so that the straight panel edges contact throughout their heights, the panel 3 being held in a yieldable wedge-like engagement with panel 1. This arrangement takes advantage of the ability of glass panels readily to withstand gradually imposed compressive strains in their own planes. Since the upper and lower ends of the juxtaposed panel edges are definitely held in place laterally of the vehicle wall, the accurate registration of their narrow contacting surfaces is assured. When the panels are thus engaged, they can be separated only by the movement of the panel 3 in its own plane away from the panel 1, while the panel 1 can not be swung out of its closed position unless the edge of panel 3 is appreciably spaced therefrom. The interlocking means that is effective for these purposes requires only one additional part, the member 21.

If desired, additional means may be provided to aid in assuring the accurate registration of the panel edges. For this purpose, the front portion of channel 7 may be extended in front of the panel 3 and may be provided with upwardly extending outwardly flared projections 28 of somewhat yieldable sheet metal, which are arranged to engage the frame of panel 1 accurately to guide the lower parts of the panel edges into close registration; see Fig. 3.

Furthermore, if desired, corresponding means may be provided for the upper edge of the panel 1, as shown in Fig. 17. For this purpose, a swinging bell crank member 30 may be arranged in the upper door rail 17, this bell crank member having a cushioning element 31 engageable by the upper edge of the panel 3 as it moves to its uppermost position. The other arm of the bell crank member is provided with a channel-like extension 32 having flared flanges which are adapted to straddle and engage the upper frame of the panel 1, as shown in Fig. 18. A spring 34 normally holds the bell crank member 30 in the position shown in dot and dash lines in Fig. 17, but when the window 3 moves to its fully raised position, the bell crank 30 swings so that the part 32 moves downwardly to engage the frame of panel 1 and to guide and hold the latter in proper alignment with the panel 3.

It will be evident that both the channel 16 which receives the upper edge of panel 3 and the bell crank 30 are supported on the upper door rail 17 so that the close alignment or registration of the upper edges of the panels may be assured. It is of course evident that the upper door rail may be provided with suitable reinforcing means extending between the upper pivot for panel 1 and the channel 16, and also supporting member 30, if that member is employed, to aid in assuring proper alignment of upper edges of the panels.

Various forms of panel edges may be employed for the panels 1 and 3, such joints preferably being characterized by surfaces which have preponderantly transverse directions of extent. The panel edges obviously may have planar surfaces with rounded corners, but I prefer to provide a slight interfitting effect. For example, as shown in Fig. 11, one of the panels may have an edge which is slightly convex, while the edge of the other panel is suitably rounded, thus permitting a very slight interfitting engagement of the panel edges.

As shown in Fig. 12, it may be noted that constructions of the type which have been described may be employed when the swinging panel 1 is disposed at a slight angle to the second panel, thus more closely to conform to the curvature of the door.

Fig. 13 illustrates a jointing arrangement which may be employed between panels formed of laminated safety glass. For this purpose, one of the panel edges may be provided with a coating of cellulosic material 40 or the like which may be integral with the similar material 41 which forms the intermediate lamination of the glass or which, if desired, may be separated from the same by a suitable sealing means. Preferably the cellulosic material 40 may be shaped to be slightly concave in horizontal cross section and may be engaged by the rounded glass edge of the adjoining panel. If desired, of course, this rounded edge may also be provided with a suitable cellulosic coating. Obviously, such cellulosic material may be employed at the edges of glass panels such as are shown in Fig. 11.

In this connection it should be noted that the panels may be formed of ordinary plate glass, of so-called "case hardened glass", or of laminated safety glass, and that the latter may have narrow opaque strips of sealing material which extend along the margins of the glass to afford a protective seal for the cellulosic lamina, such constructions being regarded as within the purview of this invention and as not greatly affecting the continuously transparent character of the composite closure.

Fig. 14 illustrates a laminated safety glass construction wherein one panel is provided with a relatively thick glass lamina 42 and a thinner lamina 43 so that the cellulosic lamina 44 is offset from the median plane of the panel, the thicker lamina 42 having a somewhat concave outer edge portion to afford a seal for the rounded edge of the adjoining panel. Fig. 15 illustrates a similar construction wherein each of the glass panels is formed of layers of unequal thickness. It is evident that in each of the jointing constructions which have been described there is no tight interfitting or wedging engagement transversely of the panel edges but that one edge may extend slightly past the other in a longitudinal direction to aid in affording a proper seal and also to aid somewhat in assuring proper engagement of the panels in registration.

Fig. 7 illustrates an optional embodiment of the invention, which is quite similar to that described with reference to Fig. 1, but which provides a different form of lifting means and of interlocking means. In accordance with this embodiment of the invention, the swinging panel 1a may be similar to the panel 1 previously described and the panel 3a may be similar to the panel 3. The panel 3a is, however, provided with lifting and guiding mechanism positively to assure its movement in an exactly straight line path. Such mechanism may consist of two similar rotatable screw-threaded shafts 50, one of which is shown in Fig. 7, these shafts being disposed adjoining the front and rear portions respectively of the panel 3a and receiving internally threaded brackets 51 which are connected to the panel frame 7a corresponding to the frame 7 disclosed in Fig. 1.

Lifting means of this character is disclosed in my copending application Serial No. 670,488 (United States Patent No. 2,028,143), and suitable gearing 52 is provided to cause the uniform rotation of each of the worms so that both ends of the panel are moved uniformly, the pitch of the threaded shafts 50 being such that the mechanism is irreversible so that the panel may be held in any desired adjusted position.

With this type of lifting mechanism, interlocking means of the character shown in Figs. 7 and 10 may be employed; this mechanism including an arm or rod 53 extending forwardly from the window frame 7a and a cylinder 55 rotatable with the worm gear of the regulator mechanism for the swinging window panel. As shown in Fig. 10, the cylinder 55 is provided with a radial slot 56 which has considerable vertical extent and into which the end of rod 53 may move when the panel 1a is in its closed position. When the panel 1a is in an opened or partly opened position, the rod 53 engages the lower part of the cylinder 55 so that the panel 3a may not move to its uppermost position, being stopped in a position corresponding to the upper dot and dash line position of panel 3 in Fig. 1. When the panel 1a is moved to closed position, any suitable stop means (not shown) may accurately determine this position wherein the slot 56 is disposed so that the end of rod 53 may move upwardly into the same, thus permitting the window 3a to be moved to its fully raised position. The rod 53 then holds the cylinder 55 and panel 1a against swinging movement.

In general it may be noted that the interlocking means illustrated in Fig. 1 and in Fig. 7 are each characterized by a part directly fixed to the shaft that operates the swinging panel, the former functioning in conjunction with the lifter arm, the latter with an arm extending from the panel. With other lifting and guiding arrangements for the rear panel, the locking part that moves with the front panel may be different in order to cooperate with the particular lifting mechanism with which it is employed; thus, for example, a link actuable by the movement of the front panel or a part swingable by such a link may move into and out of the path of a part of the lifter mechanism or part carried by the same.

Fig. 16 illustrates a further development of the invention, the swinging panel 1b being similar to the panel 1a of Fig. 7 and being provided with a similar locking cylinder 55, but having a vertical rear edge. The second or rear panel 3b is provided with a rod 53 similar to the rod 53 of Figs. 7 and 10. With this embodiment of the invention the glass pane is disposed in an inner channel frame 7b. As shown, this frame extends only along the lower horizontal edge of the pane, but, if desired, the frame may be extended upwardly to receive the rear vertical edge of the panel in the general manner illustrated in Fig. 1. In this connection, it may be noted that the rear edge of the second panel may be framed or unframed, as desired, in any of the illustrated embodiments of this invention. The frame 7b is slidable in an outer channel frame 60 which is connected to depending sliders 62 that are slidable in vertically disposed guide channels 63 which are offset laterally relative to the panel 3b. The frame 60 and sliders 62 are constrained to follow a straight line vertical path by the guideways 63, but the inner frame member 7b is slidable longitudinally relative to the outer frame member 60, this construction being of the general type disclosed in my United States Patent No. 1,923,077, issued September 25, 1931. As also disclosed in that patent, suitable lifter mechanism may be provided to cause the upward movement of the panel 3b and its movement longitudinally. For this purpose, a chain type lifter mechanism may be employed, the position of the chain of this mechanism being shown in dash lines in Fig. 16 and being designated by numeral 65. The chain may be connected by a suitable pin 68 to the inner frame 7b of the panel. When the panel moves out of its lower position, it follows a vertical path determined by the vertical run of the chain until the pin starts passing over the upper sprocket of the mechanism whereby a longitudinal movement is imparted to the inner channel 7b and to the panel 3b, so that the latter may be moving in a substantially longitudinal direction when its front edge engages the rear edge of the panel 1b. In general, the arrangement of the channels 60 and 7b may be of the type disclosed in my prior United States Patent No. 1,923,077, so that the specific details thereof are not illustrated herein.

It is to be understood that as the panel 3b completes its final movement toward the panel 1b, the bar 53 is received in the slotted portion of the locking member 55 in the general manner illustrated in Fig. 10, but, if the panel 3a is not in closed position, the end of the rod 53 engages the cylindrical surface of the locking member and prevents the final longitudinal movement of the panel 3b. It is also evident that the upper edge of the panel 3b is received in suitable channel means, as illustrated in Fig. 6, and that, if desired, the rear edge thereof may slide in a suitable, relatively deep, vertically disposed guide channel and/or that this edge may also be framed.

Figs. 19 and 20 illustrate the principles of this invention when applied to a convertible construction. The front panel 73 is pivotally supported in the conventional manner adjoining the front post that is associated with the windshield standard S and the rear panel 75 may be guided in the general manner illustrated in Fig. 1, it being understood that, if desired, to conform with the design of the body, the part of the frame member 8 which extends above the member 7 may be omitted.

In order to ensure the engagement of the panel edges, the frame 76 of the panel 73 is provided with flared extensions 78, these extensions being flared outwardly both in a downward and in a rearward direction, so that as the edge of the panel 75 is moving upwardly and forwardly toward the panel 73, this edge is received between the extensions 78 of closed panel 73 and is guided into engagement with the same. It is evident that the interlocking means prevents the panel 75 from approaching elements 78 unless the panel 73 is closed.

Figs. 21, 22 and 23 illustrate an embodiment of this invention which is quite similar to the subject matter of my copending application Serial No. 670,488, filed May 11, 1933. The swinging panel 80 may be arranged in the conventional manner and the second panel 81 may be disposed behind the swinging panel and may be guided by any suitable means, such, for example, as screw-threaded shafts of the type shown in Fig. 7. Such means may conveniently constrain the panel 81 to follow a straight line vertical path. The panel 81, however, is disposed in a plane which is offset laterally relative to the plane of the panel 80, as shown in Fig. 22, so that when the panels 80 and 81 are both in closed positions, their edges are in spaced overlapping relationship. Such an arrangement provides a moderate amount of ventilation and permits the effect of a continuous transparent closure to be attained under most operating conditions.

Under adverse weather conditions, however, a swinging filler strip 82 may be movable into the space between the panel edges. Such a strip may be arranged in the general manner disclosed in my above-identified application and may include a metal core member 83 sheathed in rubber 84. In its normal lowered position, which is shown in dot and dash lines in Fig. 21, the strip 82 may be received in a suitable recess 86 beside the panel 81.

A suitable operating handle 87 is connected to a shaft having a cranked portion 88 to straddle the front edge of panel 81, the other end of the crank shaft being connected to the bracket 89 which supports the strip 82. Thus when the handle 87 is actuated, the strip is swung from its lowered to its raised position. This movement may occur when the panels 80 and 81 are in opened or partially opened or closed positions.

Preferably locking means is provided upon the upper door rail 90 to hold the upper end of strip 82 in raised position. Such means may be a conventional snap latch provided with a control knob 91. Thus when the filler strip is swung upwardly, the latch automatically locks it in raised position, and when the strip is to be swung downwardly, the latch is manually released. Such means positively retains the strip in raised position and prevents unauthorized lowering of the same by persons who otherwise might obtain access to the door lock.

Fig. 24 illustrates a front swinging panel 100 which may be employed, for example, in a rear quarter window and may be arranged to cooperate with a pivotally mounted rear panel 101, the latter being supported by a pivotally mounted bracket 102 and controlled by an operating handle 103, any suitable locking means being arranged to hold the panel 101 in its raised position, such a construction being of the type disclosed in my United States Patent No. 1,826,922. The panel 100 may be provided with a locking member similar to the locking member 55 of Fig. 10, and the supporting frame 102 of the panel 101 is provided with a forwardly projecting rod 104 to engage the slotted portion of such a locking member, thus to prevent the movement of the panel 101 to its fully closed position when the panel 100 is partially or fully opened. It is of course evident that the frame for the panel 101 may extend about the rear and upper edge of the same, if desired.

Fig. 25 illustrates another arrangement which is particularly suitable for rear quarter windows. The front panel 100a may be of the type described with reference to Fig. 24, while the rear panel 110 is constrained to slide in a longitudinal path. The rear edge of this panel is received in a channeled member 111 which is connected to toggle linkage 112 controlled by an operating handle 113. Preferably suitable cushioning material may be disposed between the member 111 and the rear edge of the glass panel in the general manner illustrated in Fig. 2. The lower part of the panel 110 has a rod 115 connected thereto which may cooperate with a locking member associated with the regulating mechanism of panel 100a, such a member being of the general type illustrated in Fig. 10 so that the panel 110 may not be moved to its fully closed position until the panel 100a is closed and the front portion of rod 115 may move longitudinally into the slotted portion of the locking member. It is evident that the toggle mechanism 112 is effective in holding the front edge of the panel 110 against the edge of the closed panel 100.

While I have disclosed herein various swinging panels, each of which are movable about an intermediate up-and-down axis, it is evident that the principles of this invention may be employed with a panel swinging about an axis at its end. It is furthermore to be noted that the arrangement illustrated in Fig. 21 may be employed where the concealed filler strip is disposed in a position over the window opening in the general manner illustrated in my above-identified copending application Serial No. 670,488 rather than below the window opening. If desired, rubber guiding elements or the like such as the elements 31, shown in my United States Patent No. 1,826,922, may be employed in conjunction with the upwardly moving second panel in a combination of the type disclosed herein, such elements also aiding in guiding the lower portion of the front edge of the panel into registration with the edge of the swinging panel. Various other guiding means for the upwardly moving panel may be employed such as known guiding means provided with suitable rollers to define the path of the panel and yet to prevent binding thereof.

It is evident that the present invention affords various means to permit the provision of a composite window including a swinging panel and a panel movable in its own plane, so that the panels may not engage each other, unless the swinging panel is in its closed position, and so that the swinging panel can not be moved out of that position when the second panel is in its closed position.

It is furthermore evident that the present invention affords arrangements which avoid the conventional opaque stanchion or post which divides the window opening in vehicles employing ventilating systems including a swinging panel, thus enhancing the appearance of such constructions and aiding visibility and thus increasing safety. It is also evident that this invention affords means assuring the accurate guiding of the window edges into proper registration and their automatic relative adjustment so that the entire edges of the panels may contact to afford a weather-tight seal.

I claim:

1. In a vehicle body, a transparent panel swingable about an up-and-down axis, a second panel movable in its own plane, said panels having adjoining transparent edges, said panels being movable into juxtaposition with their transparent edges contacting to afford a substantially continuous transparent closure, and means preventing movement of the second panel into the position wherein it may contact the first panel except when the first panel has already been swung to a position to be contacted by the second panel.

2. In a vehicle body, a transparent panel swingable about an up-and-down axis, a second panel movable in its own plane, said panels having adjoining transparent edges, said panels being movable into juxtaposition with their transparent edges contacting to afford a substantially continuous transparent closure, and means to prevent swinging movement of the first panel when the second panel is in contact therewith.

3. In a vehicle body, a transparent panel swingable about an up-and-down axis, a second panel movable in its own plane, said panels having adjoining transparent edges, said panels being movable into juxtaposition with their transparent edges contacting to afford a substantially continuous transparent closure, means preventing movement of the second panel into the position wherein it may contact the first panel except when the first panel has been swung to a position to be contacted by the second panel, and means to prevent swinging movement of the first panel when the second panel is in contact therewith.

4. In a vehicle body, a transparent panel swingable about an up-and-down axis, a second upwardly movable panel, said panels having adjoining transparent edges, said panels being movable into juxtaposition with their transparent edges contacting to afford a substantially continuous transparent closure, a part concealed within the body and swingable with the first panel, an element movable upwardly with the second panel, said part and element being construed and arranged so that the second panel may move to contact the first panel when the first panel is positioned to be engaged by the second panel, but so that final movement of the second panel is precluded when the first panel is not thus positioned, said part and element also cooperating to prevent swinging movement of the first panel when the second panel is contacting the first panel.

5. A vehicle body comprising a body wall section, a first panel swinging about an up-and-down axis and movable to closed position on said section, a second panel slidable in its own plane on said section, the panels having adjoining transparent edges, the edge of the second panel during its final movement contacting the edge of the closed first panel, a part operatively connected with the first panel and movable therewith, a second part movable with the second panel, said first part being in a position to block the movement of the second part to prevent final movement of the second panel when the first panel is out of its closed position, said first part being movable out of the path of the second part when the first panel moves to closed position thus to permit final movement of the second panel, the second part blocking the movement of the first part when the panels are contacting thus to prevent swinging movement of the first panel.

6. A vehicle body comprising a body wall section, a first panel swinging about an up-and-down axis and movable to closed position on said section, a second panel slidable in its own plane on said section, the panels having adjoining transparent edges, the edge of the second panel during its final movement contacting the edge of the closed first panel, a part operatively connected with the first panel and movable therewith, a second part movable with the second panel, said first part being in a position to block the movement of the second part to prevent final movement of the second panel when the first panel is out of its closed position, said first part being movable out of the path of the second part when the first panel moves to closed position thus to permit final movement of the second panel, the second part blocking the movement of the first part when the panels are contacting thus to prevent swinging movement of the first panel, said panels being arranged so that the second panel has a component of motion perpendicular to the edge of the first panel during the final movement of the second panel.

7. A vehicle body comprising a body wall section, a first panel swinging about an up-and-down axis and movable to closed position on said section, a second panel slidable in its own plane on said section, the panels having adjoining transparent edges, the edge of the second panel during its final movement contacting the edge of the closed first panel, a part operatively connected with the first panel and movable therewith, a second part movable with the second panel, said first part being in a position to block the movement of the second part to prevent final movement of the second panel when the first panel is out of its closed position, said first part being movable out of the path of the second part when the first panel moves to closed position thus to permit final movement of the second panel, the second part blocking the movement of the first part when the panels are contacting thus to prevent swinging movement of the first panel, said second panel being movable upwardly and at an angle inclined toward the edge of the first panel as it is contacting the same.

8. A vehicle body comprising a body wall section, a first panel swinging about an up-and-down axis and movable to closed position on said section, a second panel slidable in its own plane on said section, the panels having adjoining transparent edges, the edge of the second panel during its final movement contacting the edge of the closed first panel, a part operatively connected with the first panel and movable therewith, a second part movable with the second panel, said first part being in a position to block the movement of the second part to prevent final movement of the second panel when the first panel is out of its closed position, said first part being movable out of the path of the second part when the first panel moves to closed position thus to permit final movement of the second panel, the second part blocking the movement of the first part when the panels are contacting thus to prevent swinging movement of the first panel, said section providing an upper portion to receive and guide the upper edge of the second panel, said panel being movable upwardly to a closed position wherein its upper edge is thus received while it is still spaced from the first panel.

9. In a vehicle body, a body wall section providing a window opening with an upper rail, a first and a second window panel carried by said section, said panels having edges which may contact, the second panel being movable upwardly at an angle to the adjoining edge of the first panel, the section providing a guide channel to receive the upper edge of the second panel while it is still spaced from the first panel, the second panel then having a further final movement to cause it to contact the first panel and its upper edge to rise higher in said guide channel.

10. A vehicle body comprising a body wall section, a first panel swinging about an up-and-down axis and movable to closed position on said section, a second panel slidable in its own plane on said section, the edge of the second panel during its final movement contacting the edge of the closed first panel, a part operatively connected with the first panel and movable therewith, a second part movable with the second panel, said first part being in a position to block the movement of the second part to prevent final movement of the second panel when the first panel is out of its closed position, said first part being movable out of the path of the second part when the first panel moves to closed position thus to permit final movement of the second panel, the second part blocking the movement of the first part when the panels are contacting thus to prevent swinging movement of the first panel.

11. A vehicle body comprising a body wall section, a first panel swinging about an up-and-down axis and movable to closed position on said section, a second panel slidable in its own plane on said section, the panels having adjoining transparent edges, the edge of the second panel during its final movement contacting the edge of the closed first panel, a part operatively connected with the first panel and movable therewith, a second part movable with the second panel, said first part being in a position to block the movement of the second part to prevent final movement of the second panel when the first panel is out of its closed position, said first part being movable out of the path of the second part when the first panel moves to closed position thus to permit final movement of the second panel, the second part blocking the movement of the first part when the panels are contacting thus to prevent swinging movement of the first panel, said panels being arranged so that the second panel has a component of motion perpendicular to the edge of the first panel during the final movement of the second panel, said second panel including a frame, and a pane with yieldable means therebetween, the yieldable means permitting movement of the pane in its own plane relative to the frame as the panel edges contact thus assuring a tight joint therebetween.

12. A vehicle body comprising a body wall section, a first panel swinging about an up-and-down axis and movable to closed position on said section, a second panel slidable in its own plane on said section, the panels having adjoining transparent edges, the edge of the second panel during its final movement contacting the edge of the closed first panel, a part operatively connected with the first panel and movable therewith, a second part movable with the second panel, said first part being in a position to block the movement of the second part to prevent final movement of the second panel when the first panel is out of its closed position, said first part being movable out of the path of the second part when the first panel moves to closed position thus to permit final movement of the second panel, the second part blocking the movement of the first part when the panels are contacting thus to prevent swinging movement of the first panel, one of said panels having a frame with flared elements to engage the margin of the other panel to aid in guiding the panel edges into accurate mutual registration.

13. A vehicle body comprising a body wall section, a first panel swinging about an up-and-down axis and movable to closed position on said section, a second panel slidable in its own plane on said section, the panels having adjoining transparent edges, the edge of the second panel during its final movement contacting the edge of the closed first panel, a part operatively connected with the first panel and movable therewith, a second part movable with the second panel, said first part being in a position to block the movement of the second part to prevent final movement of the second panel when the first panel is out of its closed position, said first part being movable out of the path of the second part when the first panel moves to closed position thus to permit final movement of the second panel, the second part blocking the movement of the first part when the panels are contacting thus to prevent swinging movement of the first panel, said second panel being movable upwardly and at an angle inclined toward the edge of the first panel as it is contacting the same, said second panel including a pane, a lower frame member and an upstanding frame member, said members receiving respectively the lower edge of the pane and its edge remote from the first panel, and yieldable means between the pane and frame members permitting relative movement therebetween in the plane of the pane, said means being stressed as the panel edges contact and permitting them to contact throughout their heights, whereby a tight joint is afforded, even if the edges are not parallel upon initial contact and whereby the second panel is held in yieldable wedge-like engagement with the first panel.

14. A vehicle body comprising a body wall section, a first panel swinging about an up-and-down axis and movable to closed position on said section, a second panel slidable in its own plane on said section, the panels having adjoining transparent edges, the edge of the second panel during its final movement contacting the edge of the closed first panel, a part operatively connected with the first panel and movable therewith, a second part movable with the second panel, said first part being in a position to block the movement of the second part to prevent final movement of the second panel when the first panel is out of its closed position, said first part being movable out of the path of the second part when the first panel moves to closed position thus to permit final movement of the second panel, the second part blocking the movement of the first part when the panels are contacting thus to prevent swinging movement of the first panel, said section providing an upper portion to receive and guide the upper edge of the second panel, said panel being movable upwardly to a closed position wherein its upper edge is thus received while it is still spaced from the first panel, said first part permitting the movement of the second panel to said closed position irrespective of the position of the first panel, the second panel having a further movement upwardly from said closed position if the first panel is closed.

15. A vehicle body comprising a body wall section providing a window frame, a swinging window panel on said section, a movable second window panel on said section, said panels having transverse edge surfaces which may contact, thereby to afford a continuous transparent closure with a joint provided by the transparent edges, which joint has a greater dimension transversely of the wall than in the plane thereof, said second panel having a final movement in its own plane with a component directed toward the edge of the swinging panel, said second panel including a transparent pane, a frame with a portion extending along the edge of the panel remote from the transverse edge which contacts the swinging panel, and yieldable material between the frame portion and pane permitting movement of the pane in its plane relative to said frame portion, whereby the second panel is subjected to a yieldably imposed pressure in its own plane and the panel edges are yieldably held in engagement throughout their lengths.

RAYMOND L. CARR.